United States Patent
Alimpich et al.

(10) Patent No.: US 8,587,826 B2
(45) Date of Patent: Nov. 19, 2013

(54) METHODS, APPARATUS, AND ARTICLES OF MANUFACTURE FOR IMPROVED PROCESSING OF EMBEDDED ICC PROFILES

(75) Inventors: Claudia Alimpich, Boulder, CO (US); Reinhard H. Hohensee, Boulder, CO (US); John F. Meixel, Longmont, CO (US)

(73) Assignee: Ricoh Production Print Solutions, Boulder, CO (US)

( * ) Notice: Subject to any disclaimer, the term of this patent is extended or adjusted under 35 U.S.C. 154(b) by 1271 days.

(21) Appl. No.: 11/782,328

(22) Filed: Jul. 24, 2007

(65) Prior Publication Data
US 2009/0027701 A1  Jan. 29, 2009

(51) Int. Cl.
*G06F 15/00* (2006.01)
*H04N 1/40* (2006.01)
*H04N 1/46* (2006.01)
*G06K 9/00* (2006.01)

(52) U.S. Cl.
USPC .......... 358/1.9; 358/3.21; 358/3.23; 358/500; 358/518; 382/162; 382/167

(58) Field of Classification Search
USPC ................ 358/1.9, 3.21, 3.23, 500, 518–524; 382/162, 167
See application file for complete search history.

(56) References Cited

U.S. PATENT DOCUMENTS

| | | | |
|---|---|---|---|
| 6,574,791 B1 | 6/2003 | Gauthier et al. | |
| 6,681,041 B1 | 1/2004 | Stokes et al. | |
| 7,095,529 B2 | 8/2006 | Krueger et al. | |
| 2001/0044801 A1 | 11/2001 | Senn et al. | |
| 2003/0222908 A1 | 12/2003 | Bybee et al. | |
| 2004/0257598 A1 | 12/2004 | Fujio et al. | |
| 2005/0188381 A1 | 8/2005 | Mitejura et al. | |
| 2005/0248787 A1 | 11/2005 | Aschenbrenner et al. | |
| 2005/0273524 A1 | 12/2005 | Aschenbrenner et al. | |
| 2006/0050288 A1 * | 3/2006 | Aschenbrenner et al. | 358/1.9 |

OTHER PUBLICATIONS

Hohensee, R. et al.; *AFP Color Management Architecture (ACMA) Overview*; XPLOR 2006; IBM Corporation (AFP Color Consortium); 2006.
*AFP Color Management Architecture (ACMA) Release 1*; IBM Corporation (AFP Color Consortium); Mar. 2006.

* cited by examiner

*Primary Examiner* — Twyler Haskins
*Assistant Examiner* — Justin Katzwhite
(74) *Attorney, Agent, or Firm* — Duft Bornsen•Fettig LLP

(57) ABSTRACT

Methods, systems, and articles of manufacture to enhance automation of conversion and/or persistent storage of color management information embedded within an associated, received data object. Features and aspects hereof provide that color management information embedded within an identified data object (e.g., an image data object) is converted to an appropriate form useful within the printing environment and persistently stored for re-use in conjunction with presentation of received data objects in a print job. For example, an ICC profile embedded within a received image data object may be converted to an AFP color management resource (a color conversion CMR and/or zero or more link CMRs) and persistently stored in an object library for re-use in presentation of print jobs. The conversion and persistent storage of such color management information may be substantially automated as a step in the installation of the underlying data object.

16 Claims, 5 Drawing Sheets

METHODS, APPARATUS, AND ARTICLES OF MANUFACTURE FOR IMPROVED PROCESSING OF EMBEDDED ICC PROFILES

BACKGROUND OF THE INVENTION

1. Field of the Invention

The present invention relates color management information in a printing application environment and more specifically relates to improved generation and utilization of color management resources from color management information embedded within presentation objects in a printing application environment.

2. Discussion of Related Art

In a printing environment a printing system coupled to one or more attached host systems and/or associated servers may imprint information on a printable medium such as paper. The information to be imprinted may include textual information as well as graphical or image information. Collectively or individually, all such information may be referred to herein as "presentation objects" or as "data objects". Additional received information specifically relating to color printing may be received. Meta-data objects may be associated with presentation objects to be printed such that the meta-data helps, for example, to standardize the desired color output. In one common approach, an International Color Consortium (ICC) profile may be supplied by the application that generates the print source data (the "presentation data"). In general the ICC profile defines standardized color parameters associated with the particular data to be presented and associated with the particular application or device that generated the initial presentation data. For example, digital cameras and scanning devices may digitize an image into any of several well-known encoding formats and may also generate a corresponding ICC profile representing the color parameters of the camera or scanning device. Using the ICC profile of the generating device or application, the printing system may then computationally map the parameters of the generating device into corresponding parameters for the printing device intended to present the corresponding textual or graphic information with the desired colors faithfully reproduced.

In many printing application environments, standard portions of information to be imprinted may be setup as an initial task prior to printing a print job or even prior to generating the print job. For example, a collection of images such as digital photographs, scanned images, graphical art (such as corporate or product logos), etc. may be initially defined and setup as reusable objects defined in an object library. When these objects include color information (e.g., color attributes applied to textual or graphical objects), an ICC profile may be supplied to define color parameters to permit accurate reproduction of the color when the object is eventually applied to a printing device for imprinting on a medium. In general, when a printing system uses an ICC profile regarding the color characteristics of a generating device or application, the printing system performs substantial computation to translate, transform, or convert the supplied color parameters into associated color parameters for the printing device. The computation and transformation associated with such color parameter information helps assure that the printing system produces the desired colors as accurately as possible in accordance with the standardized defined reference values.

In view of the substantial computations involved with transforming or converting such color parameter information (e.g., the ICC profile of the generating device for application), it is desirable and common to reduce or minimize duplicative computations for such transformations and conversions—especially if the same ICC profile is to be used in conjunction with multiple data objects. For example, the printing system may convert or transform the associated color parameters of the ICC profile into an appropriate format for later use by the printing system. More specifically, for example, when an Advanced Function Presentation (AFP) environment is provided with an ICC profile, the color parameter information of the ICC profile is converted into a corresponding AFP color conversion color management resource (a CMR or more specifically a "CC CMR"). In the AFP environment, a "link CMR" may also be pre-computed that incorporates color management information regarding the translation from an input device CMR (i.e., the device or application that generated a data object) into the color management information related to each specific printing device on which a print job may be presented. A link CMR is known in the AFP environment as an enhancement that pre-computes the conversion of color data from an identified input device into appropriate color information on a particular output device. Thus zero or more link CMRs may be precomputed for each identified input device to map the color information to one or more possible output devices (e.g., one or more identified printer systems or other presentation devices). Multiple data objects may reuse that same ICC profile and thus the same generated CMR structures may be reused to reduce computational loads when a print job is later processed using the stored data objects. Thus the ICC profile information is converted (translated or transformed) into a format that may be reused by an AFP printing device and that minimizes computational load on the printing device.

The pre-computed CMR objects (e.g., CC CMR and zero or more link CMRs) are also saved in the object library of an AFP environment for later reuse when printing a print job that references the converted ICC profile. In particular, for an AFP compliant printing system, data objects and ICC profile objects (as converted to CC and link CMRs) are stored in the object library of the AFP enterprise.

As presently practiced, the AFP resource installer (as well as similar object or resource installers or creators) processes data objects to be stored in the object library as a separate and distinct matter relative to the processing of an ICC profile. In other words, a user invokes the data object installer portion of the AFP resource installer (also referred to herein as a data object installer wizard) to install data objects. The user also separately invokes a CMR object installer portion of the AFP resource installer (also referred to herein as a CMR object installer wizard) to convert ICC profile objects into CMR objects and the install the CMR objects in the object library. The data object installer also interacts with the user to associate the installed CMR object with any related data objects in the object library. Typically, data objects and ICC profiles are received as separate objects provided by the user of the AFP resource installer modules. Thus, an ICC profile when separately received by an AFP printing system will be transformed into an appropriate CMR and stored for subsequent utilization. When presentation objects are provided by a user that reference an earlier provided ICC profile (now converted to a corresponding CMR object in the object library), the data object is processed by the data object installer in the object library.

In some situations, the ICC profile may be embedded within the data object to be presented. For example, in one common approach, a tagged image file format (TIFF) presentation object may be generated by a scanning device or digital camera (or any other suitable means or application program for generating a TIFF presentation object). The ICC profile for the device or application that generates the TIFF image may be embedded with the TIFF image data. Interactions with a user of the resource installer are less straightforward when a presentation object has embedded color parameter information (e.g., a TIFF presentation object with an embedded ICC profile). In present print setup applications such as the AFP resource installer, the user/operator is required to invoke a data object installer portion of the resource installer to install the TIFF image as a data object. The user must then manually extract or otherwise provide the ICC profile information to apply it as input to the manually invoked CMR installer portion of the resource installer. In other words, in current systems a first manual operation may be required of an operator to store a data object such as an image data object and a second manual operation is required of an operator to store color management information (e.g., the ICC profile as converted to the printing system's preferred format). The inconvenience and duplicative operations demanded of such a user may give rise to opportunities to introduce errors and/or may impose a further burden on a user/operator of the printing system It is evident from the above discussion that improved methods and systems are required to reduce the burden on the operator/user of the print setup application and to thereby reduce the opportunity for human error in persistently storing a data object and associated color management information embedded in the data object.

SUMMARY OF THE INVENTION

The present invention solves the above and other problems, thereby advancing the state of the useful arts, by providing methods, systems, and associated articles of manufacture for substantially automating the process of generating and persistently storing (in an object library) color management information embedded within a received object. In one exemplary embodiment, color management information such as an ICC profile may be embedded within a graphical presentation object to be persistently stored in the object library. The user may invoke an object installer to install the image data object. Features and aspects hereof detect the presence of such embedded color management information and automatically direct the user to select appropriate options for automatically converting and/or saving the embedded color management information. The embedded color management information may then be removed from the data object in the object library to reduce the storage requirements and the associated data transfer time when transferring the stored object to a presentation device. Another exemplary embodiment specifically provides for enhancement of an AFP resource installer adapted to receive presentation objects having embedded ICC profile information (e.g., color management information). The AFP resource installer program product may be enhanced in accordance with features and aspects hereof to detect the presence of the embedded ICC profile and to automatically guide the user through installation (e.g., persistent storage) not only of the underlying presentation object but also through the steps to convert and persistently store an AFP color management resource (CMR) object derived from the color management information embedded within the received presentation object. The CMR object so generated and persistently stored may later be used by the printing environment when printing the data object in which the underlying color management information was embedded as well as other data objects that rely upon the same color management information.

In a first aspect hereof, a method is provided for installing objects in an object library of a printing environment. The method includes receiving from a user a data object having embedded color management information. The method then stores the data object in an object library of the printing environment. The method also detects the presence of the embedded color management information in the received object. The method also generates a color management resource (CMR) wherein information in the CMR is derived from the embedded color management information. The method also stores the CMR in the object library for re-use within the printing environment in conjunction with presenting objects of a print job. The method steps of detecting, generating, and storing the CMR are performed automatically in conjunction with the step of storing the data object.

Another aspect hereof provides a method for storing objects in an object library of an Advanced Function Presentation (AFP) printing environment. The method includes receiving from a user a presentation object having an embedded International Color Consortium (ICC) profile embedded within the presentation object. The method then determines whether the ICC profile corresponds to a stored AFP color management resource (CMR). The method then associates the corresponding stored AFP CMR with the presentation object in response to a determination that the ICC profile corresponds to a stored AFP CMR. Responsive to a determination that the ICC profile does not correspond to any stored AFP CMR, the method then continues by automatically generating an AFP CMR wherein information in the AFP CMR is derived from the ICC profile and associating the generated AFP CMR with the presentation object. The method then stores the presentation object and the AFP CMR in an object library of the AFP printing environment for re-use in conjunction with presenting objects of a print job.

DETAILED DESCRIPTION OF THE DRAWINGS

Figure 3:
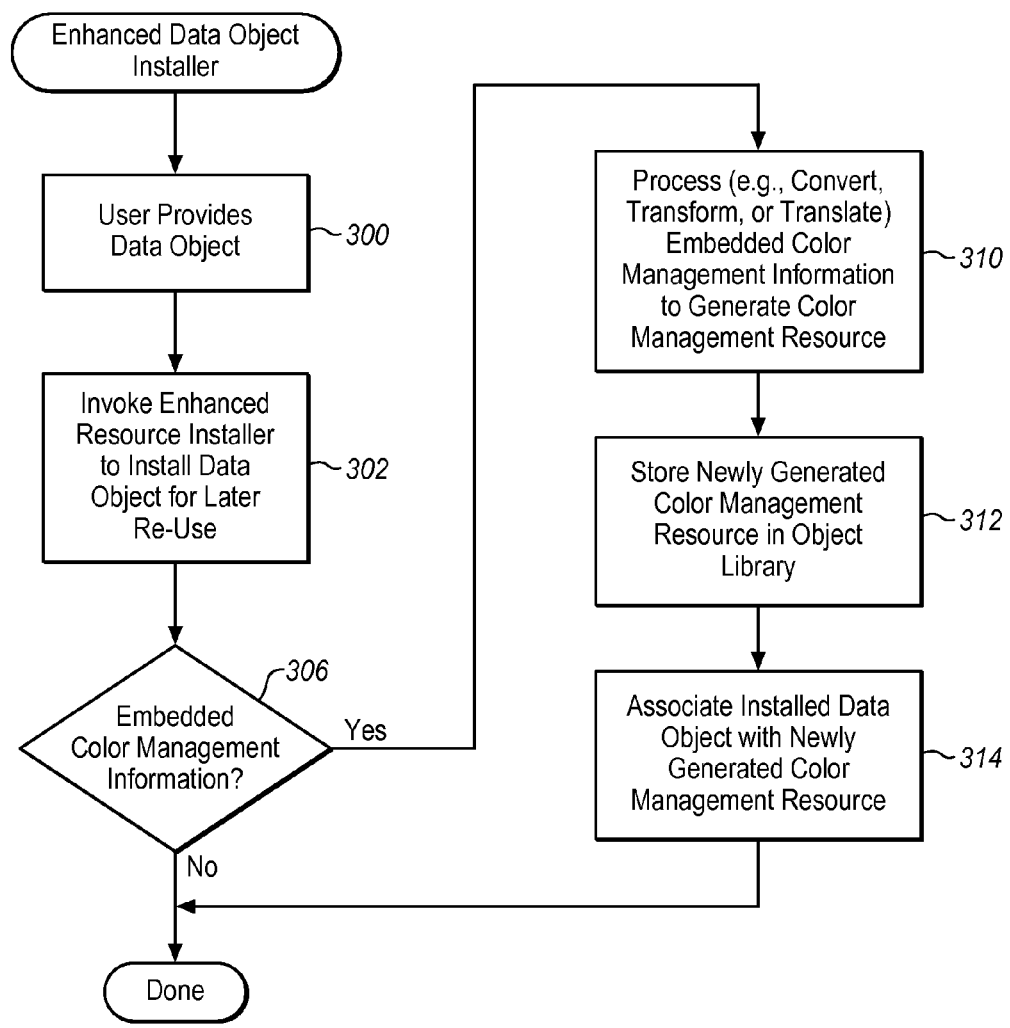
FIGS. 3 and 4 are each flowcharts describing exemplary methods for improved setup processing of data objects and embedded color management information in accordance with features and aspects hereof.
Figure 4:
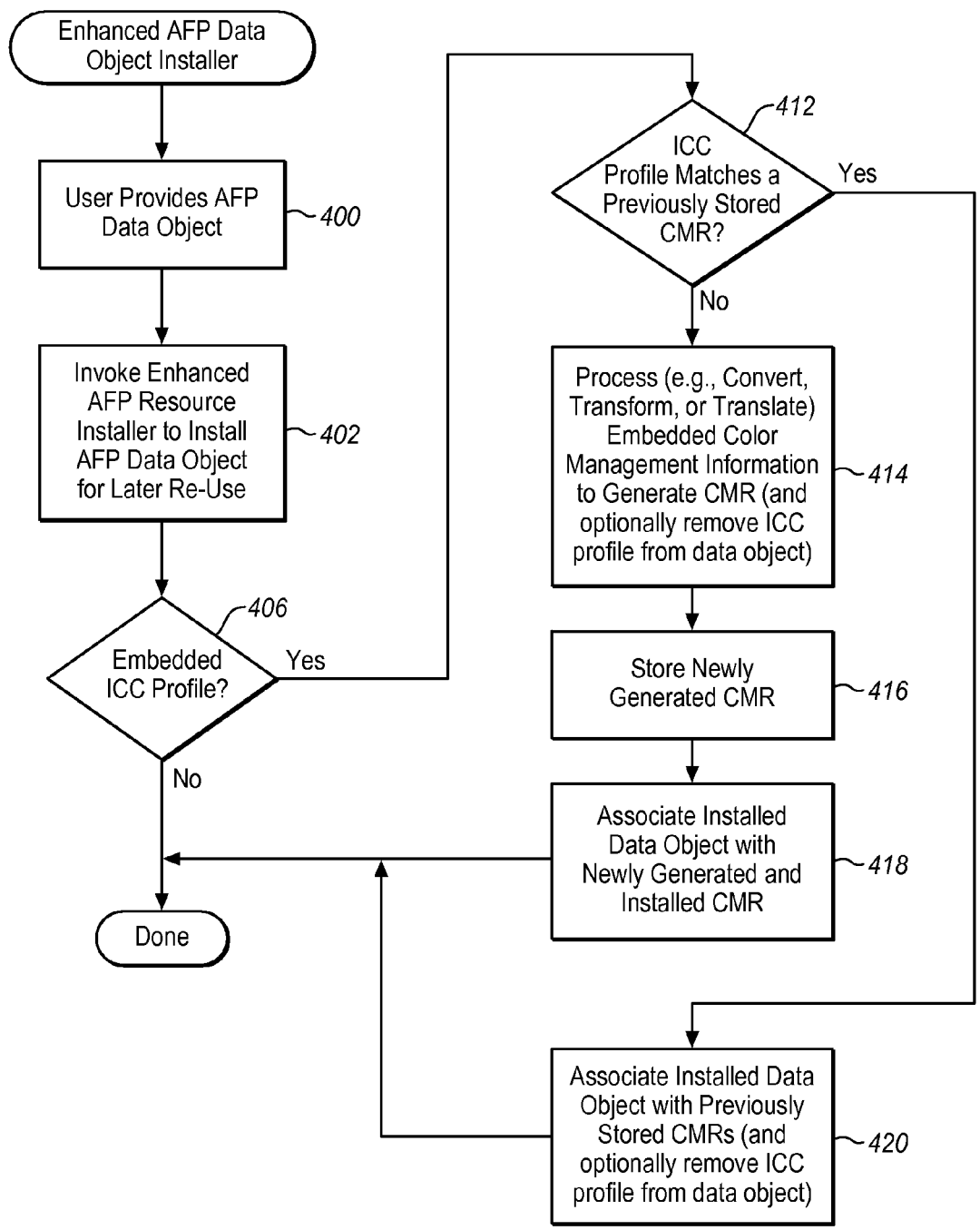
Figure 5:
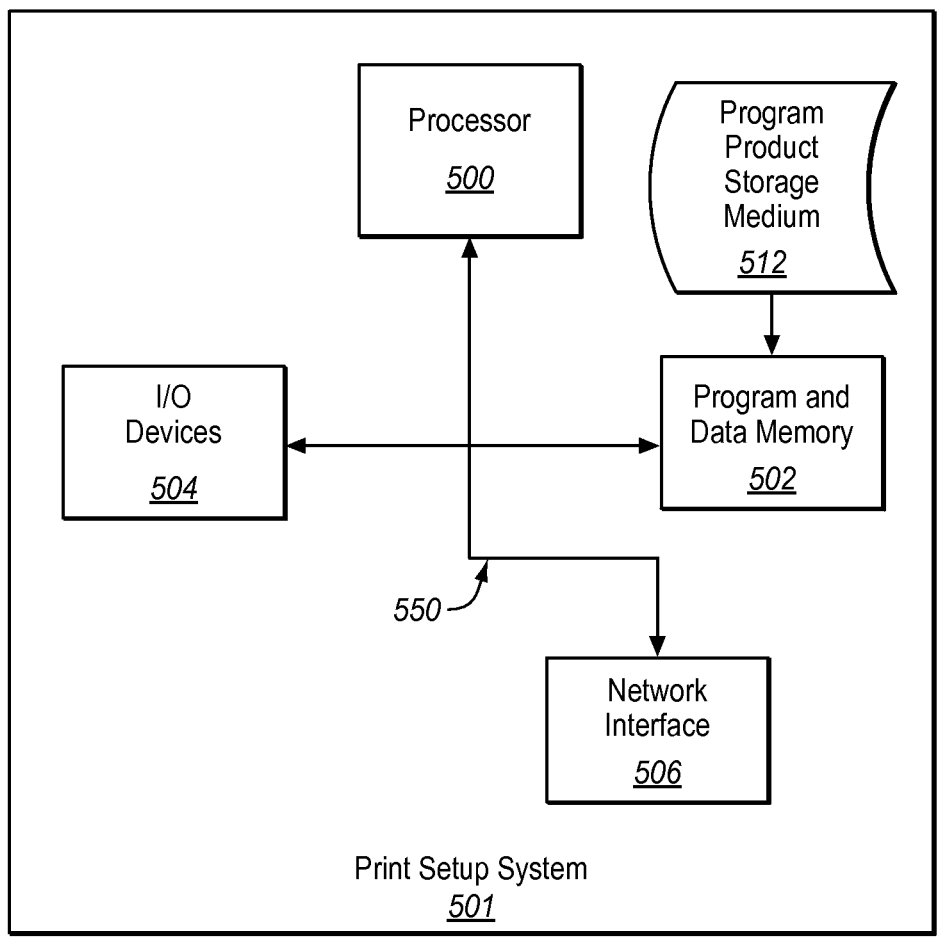
FIG. 5 is a block diagram of an exemplary system that may provide enhanced setup processing features and aspects hereof, the system including bulk storage of a program product that may embody methods and processes hereof.

FIGS. 3 through 5 and the following description depict specific exemplary embodiments of the present invention to teach those skilled in the art how to make and use the invention. For the purpose of this teaching, some conventional aspects of the invention have been simplified or omitted. Those skilled in the art will appreciate variations from these embodiments that fall within the scope of the present invention. Those skilled in the art will appreciate that the features described below can be combined in various ways to form multiple variations of the present invention. As a result, the invention is not limited to the specific embodiments described below, but only by the claims and their equivalents.

Figure 1:
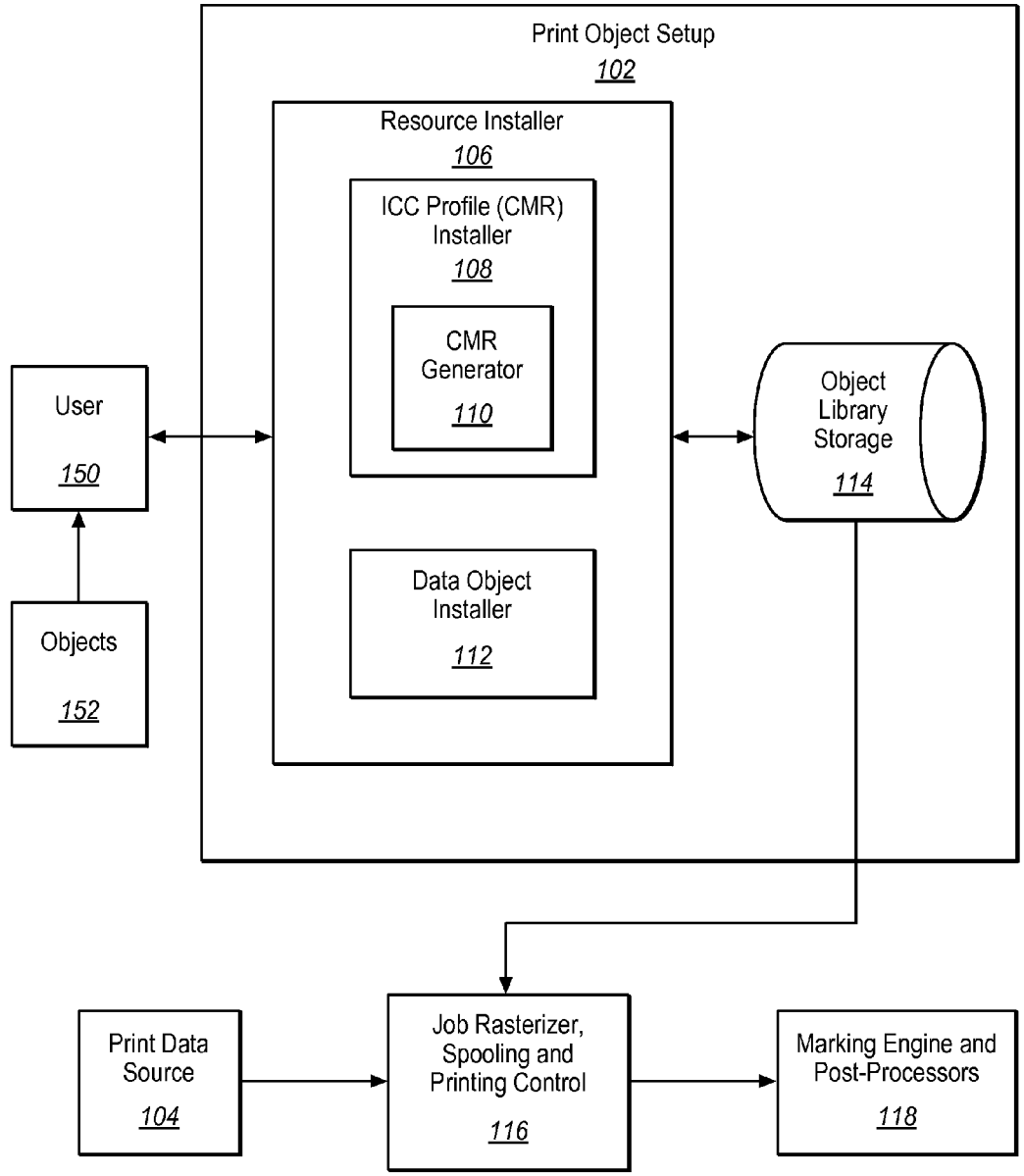
FIG. 1 is a block diagram of a printing system as presently known in the art in which data objects may be processed for setup for use by one or more related print jobs.

FIG. 1 is a block diagram of a system 100 as is presently known for setup of objects to be used in the presentation of documents. System 100 may include a print object setup 102 that, through interaction with user 150, generates or provides objects 152 to be stored in object library 114. User 150 interacts with a data object installer 112 portion of a resource installer 106 to provide data objects to be persistently stored in object library 114. Examples of such data objects may include, for example, image data objects. A user 150 identifies an object 152 to be installed in the object library by the resource installer 106. The object may be a data object such as an image data object or the object may be an object representing color management information such as an ICC profile of a device that generated one or more presentation objects.

Print object setup application 102 may physically reside within any of several processing elements of a printing environment including any of various user application computing nodes, compute server nodes, print server related nodes, etc. Further, any number of such computing nodes or devices may be distributed in an enterprise for processing of print jobs. Numerous such printing environments are well known to those of ordinary skill in the art including, for example, an InfoPrint printing environment, and AFP environment. Such distributed network processing and program paradigms are well known to those of ordinary skill in the art. In particular, the resource installer 106 and the object library storage 114 may both physically reside within the same computing node or may be distributed over any number of computing nodes and servers.

User 150 interacts with resource installer 106 utilizing the data object installer 112 portion of the resource installer 106 to persistently store a data object for subsequent use in presentation of objects of a received document. In addition, user 150 may interact with ICC profile installer 108 to generate and install a color management resource (CMR) for persistent storage and subsequent use in presentation of the associated document. A CMR generator 110 may be associated with the ICC profile installer 108 to generate an appropriate CMR object at the direction of user 150.

After setting up data and/or CMR objects in the object library 114, a print data source 104 (i.e., a print job) may be generated by an application (not shown) that utilizes the objects in the object library 114. A job processor (rasterizer, spooling and print control element 116) may process the print data source 104 and access the objects in object library 114 to process the print job for application to a marking engine 118 (or other presentation device).

As noted above, as presently practiced in the art and as depicted in FIG. 1, the installation of a data object containing an embedded ICC profile presents difficulties. Current typical practices entail a two step manual process by an operator (e.g., user 150) of the printing environment. First, an identified data object (e.g., an image data object such as a TIFF image) may be installed for reuse within the document to be presented (printed). The data object is installed by user 150 interacting with the data object installer 112 portion of resource installer 106. The image data object may include embedded color management information such as an embedded ICC profile. Second, a user is then required to perform further manual processing to install any associated ICC profile information as a reusable, persistently stored, color management resource. In the context of presently practiced systems, a user is responsible for manual procedures to extract the desired information embedded within the underlying data object and then manually generate and install any desired color management information for reuse in processing of the document. Requiring two manual procedures for such installation presents a burden to the user and permits additional opportunities for human induced errors in the procedure.

Figure 2:
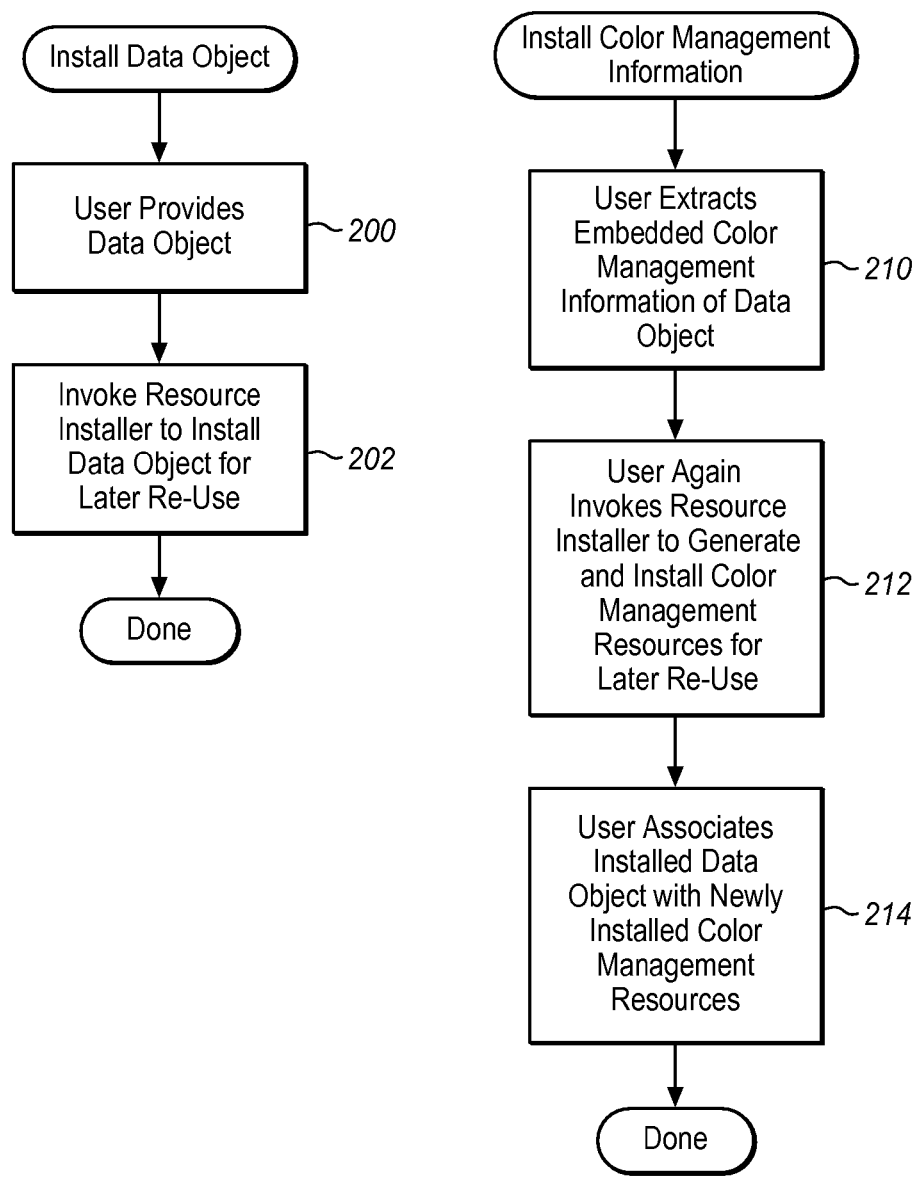
FIG. 2 is a flowchart describing typical processing of data objects and color management information objects as presently practiced in the art in which data objects and associated color management information must be processed through separate, distinct, and substantially manual procedures.

FIG. 2 is a flowchart representing processing as presently practiced in the art requiring two essentially manual procedures to be utilized for installation of the data object and any associated color management resources. A first method represented as elements 200 through 202 represents processing to install user supplied data objects in an object library of the printing enterprise. Element 200 is generally responsible for processing user input identifying data objects to be installed. Element 202 is then operable to invoke the resource installer to interact with the user to install the identified data object in the object library for subsequent reuse. Exemplary of such a resource installer is the AFP Resource Installer process well known to those of ordinary skill in the art.

Elements 210 through 214 represent a separate and distinct process invoked by a user and interactive with the user to install in the object library color resource management objects extracted or otherwise derived from color management information associated embedded within the installed data object. Element 210 represents processing by a user to extract the color management information embedded within the data object just installed by the user. The embedded color management information may be, for example, an ICC profile for the device or application that generated an image represented by the data object just installed. Element 212 then generates a CMR object derived from the color management information. The CMRs are generated by copying and appropriately translating the ICC profile information embedded in the data object. Element 212 also represents processing by the user, again invoking the resource installer, to interact with a CMR installer portion thereof to install the CMR in the object library. Element 214 then represents processing by the user, interacting with the data object installer, to associate the newly installed CMR object with the previously installed data object in the object library. Those of ordinary skill in the art will recognize that the generated CMR objects and the data objects may be stored in a single, common object library or may be installed in separate, corresponding object libraries (e.g., a data object library and a separate CMR object library). Such design choices will be readily apparent to those of ordinary skill in the art.

As noted above the two separate and distinct processes each require substantial manual intervention to identify data objects, to identify associated color management information, to persistently store the identified objects and color management information, and to associate the identified objects and information as required for processing. Such manual processing burdens a user and creates numerous opportunities for human error.

By contrast, FIG. 3 is a flowchart representing exemplary improvements in accordance with features and aspects hereof wherein setup processing of data objects in a print environment is more automated as regards processing of data objects and any associated color management information. In particular, the method of FIG. 3 is useful in job setup processing where image data objects may include embedded ICC profile information. Such image data objects may be encoded in any of several well known file and data formats including, for example, tagged image file format (TIFF), joint photographic experts group (JPEG or JPG), graphics interchange format (GIF), image object content architecture (IOCA), portable document format (PDF), encapsulated Postscript (EPS), and printer control language (PCL). Element 300 is generally responsible for processing user input identifying data objects to be installed. Element 302 is then operable to invoke the enhanced resource installer to interact with the user to install the identified data object in the object library for subsequent reuse. Exemplary of such a resource installer is the AFP Resource Installer process well known to those of ordinary skill in the art. Element 306 then determines whether the installed data object resource includes any embedded color management information. If not, processing of this data object is complete. If so, element 310 is next operable to process the embedded color management information to generate an appropriate color management resource to be persistently stored in the object library for reuse in later processing of a document. Processing of element 310 may extract, copy, convert, transform, and/or translate the embedded color management information to generate a corresponding color management resource (CMR). In particular, a user may indicate that the embedded color management information is to be copied from the associated data object for the desired processing or the user may indicate that the embedded color management information is to be removed from the associated data object following processing of element 310. For example, an embedded ICC profile may be converted to an AFP color management resource (CMR) object. In particular, as discussed above, the generated CMR may include a color conversion (CC CMR) zero or more AFP link CMRs that directly converts the profile of the input devices (e.g., scanner or digital camera) associated with an underlying image data object to the profile of the output device (printer). Such link CMRs are known in the art and are used to dramatically simplify later computations required for rendering an underlying image data object to ensure desired color fidelity. Thus, it is to be understood hereinafter that reference to generation and storing of a CMR object may mean generation and storage of a CC CMR and zero or more link CMR. Thus all CMR objects generated may be referred to herein for simplicity as simply a CMR object regardless of the actual number of link CMRs generated and stored for a particular converted ICC profile.

The CMR object generated by processing of element 310 may then be persistently stored in the object library by operation of element 312. The stored CMR object may then be referenced by data objects in subsequent processing of a print job in association with rendering of the received data objects. Lastly, element 314 is operable to associate the data object that included the embedded color management information with the newly generated, persistently stored, CMR.

The method of FIG. 3 therefore substantially automates the process of generating a desired color management resource from embedded color management information associated with a received data object. Further, the generation of zero or more AFP link CMRs from the color management information associated with the data object is substantially automated as compared to prior techniques. Such automation reduces the burden on the operator and reduces the potential for human induced errors in the processing. In addition, the optional removal of the color management information from the data object just installed will reduce the size of the stored data object in the object library.

FIG. 4 is a flowchart describing another exemplary method in accordance with features and aspects hereof for enhanced job setup processing in an AFP printing environment. Element 400 is generally responsible for processing user input identifying an AFP data object to be installed in the object library. Element 402 is then operable to invoke the enhanced AFP resource installer to interact with the user to install the identified AFP data object in the object library for subsequent reuse. Element 406 then determines whether the installed AFP data object resource includes any embedded color management information such as an embedded ICC profile. If not, processing of this data object is complete. Otherwise element 412 next determines whether the embedded ICC profile (color management information) corresponds to a CMR object previously installed in the object library (e.g., stored by processing of an earlier supplied ICC profile). If so, element 420 is operable to associate the newly installed data object with the previously stored CMR object corresponding to the embedded ICC profile. Element 420 is also operable to optionally remove the embedded ICC profile from the newly installed data object. Removal of the embedded ICC profile from the data object reduces the size of the stored data object and thereby reduces processing required in later print jobs that reference the installed data object. The processing time is reduced, for example, by reducing the volume of data transferred from the library when processing the print job. If the ICC profile does not correspond to a previously installed CMR object, element 414 is next operable to process the embedded color management information (e.g., ICC profile) to generate a corresponding AFP CMR. As noted above, the processing of the embedded color management information may be optionally directed to remove the embedded ICC profile from the data object following conversion of the color management information embedded therein. In addition, as noted above, the processing of the color management information to generate a corresponding AFP CMR may entail conversion, transformation, or translation of the ICC profile information. In particular, zero or more link CMRs may be generated, each of which incorporates information specific to any of a variety of available output devices and information specific to the particular input device that generated the underlying AFP presentation object. In other words, each link CMR may include information that incorporates the ICC profile of the printing system on which any presentation object (e.g., image data object) is to be rendered and may also incorporate the ICC profile information of a scanner or digital camera device that originally generated the AFP image data object. Element 416 is then operable to store the newly generated CMR in the object library for potential reuse in processing of an AFP datastream. Element 418 associates the newly generated CMRs and the newly installed data object that originally provided the embedded ICC profile used to generate the new CMRs.

The processing of the methods of FIGS. 3 and 4 may be performed within any of several processing elements of a printing environment including any of various user application computing nodes, compute server nodes, print server related nodes, etc. Further, any number of such computing nodes or devices may be distributed in an enterprise for processing of print jobs. Numerous such printing environments are well known to those of ordinary skill in the art including, for example, an InfoPrint printing environment, and AFP environment. Such distributed network processing and program paradigms are well known to those of ordinary skill in the art. In addition, the methods of FIGS. 3 and 4 may be performed by cooperative operation of a data object installer wizard and by a CMR object installer wizard—both operable as portions of a resource installer application program operating in a single computing or server node or cooperating in a distributed computing enterprise.

Those of ordinary skill in the art will also recognized that numerous equivalent and additional method steps may be incorporated in the methods of FIGS. 3 and 4. Such equivalent and additional method steps are omitted here for simplicity and brevity of this discussion.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc. FIG. 5 is a block diagram depicting a system 501 as a data processing device adapted to provide features and aspects hereof by executing programmed instructions and accessing data stored on a computer readable storage medium 512.

Furthermore, the invention can take the form of a computer program product accessible from a computer-usable or computer readable medium 512 providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor 500 coupled directly or indirectly to memory elements 502 through a system bus 550. The memory elements can include local memory employed during actual execution of the program code, bulk storage, and cache memories which provide temporary storage of at least some program code in order to reduce the number of times code must be retrieved from bulk storage during execution.

Input/output or I/O devices 504 (including but not limited to keyboards, displays, pointing devices, etc.) can be coupled to the system either directly or through intervening I/O controllers. Network adapter interfaces 506 may also be coupled to the system to enable the data processing system to become coupled to other data processing systems or storage devices through intervening private or public networks. Modems, cable modems, IBM Channel attachments, SCSI, Fibre Channel, and Ethernet cards are just a few of the currently available types of network or host interface adapters.

Although specific embodiments were described herein, the scope of the invention is not limited to those specific embodiments. The scope of the invention is defined by the following claims and any equivalents thereof.

What is claimed is:

1. A method for installing objects in an object library of an Advanced Function Presentation (AFP) printing environment, the method comprising:
    receiving from a user a presentation object having an embedded International Color Consortium (ICC) color profile for the presentation object;
    storing the presentation object in an object library of the AFP printing environment;
    detecting the presence of the embedded ICC color profile in the presentation object;
    generating a AFP color conversion color management resource (CC CMR) wherein information in the CC CMR is derived from the embedded ICC color profile; and
    storing the CC CMR in the object library for re-use within the printing environment in conjunction with presenting objects of a print job, wherein the steps of detecting, generating, and storing the CC CMR are performed automatically in conjunction with the step of storing the presentation object.

2. The method of claim 1 wherein the step of generating the AFP CC CMR further comprises:
    removing the ICC color profile from the presentation object to reduce a storage size of the presentation object.

3. The method of claim 1 wherein the step of receiving the presentation object further comprises:
    receiving a tagged image file format (TIFF) image data object that includes the embedded ICC color profile.

4. The method of claim 1 further comprising:
    determining whether the embedded ICC color profile corresponds to a CC CMR previously generated and stored in the object library;
    bypassing the steps of generating and storing the CC CMR; and
    associating the presentation object with the previously generated and stored CC CMR.

5. A method for storing objects in an object library of an Advanced Function Presentation (AFP) printing environment, the method comprising:
    receiving from a user a presentation object having an International Color Consortium (ICC) profile embedded within the presentation object;
    determining whether the ICC profile corresponds to a stored AFP color conversion color management resource (CC CMR);
    associating the corresponding stored AFP CC CMR with the presentation object in response to a determination that the ICC profile corresponds to a stored AFP CC CMR; and
    responsive to a determination that the ICC profile does not correspond to any stored AFP CC CMR, performing the additional steps of:
        automatically generating an AFP CC CMR wherein information in the AFP CC CMR is derived from the ICC profile;
        associating the generated AFP CC CMR with the presentation object; and
        storing the presentation object and the AFP CC CMR in an object library of the AFP printing environment for re-use in conjunction with presenting objects of a print job.

6. The method of claim 5 wherein a format of the presentation object is selected from the group of formats consisting of: tagged image file format (TIFF), joint photographic experts group (JPEG or JPG), graphics interchange format (GIF), image object content architecture (IOCA), portable document format (PDF), encapsulated Postscript (EPS), and printer control language (PCL).

7. The method of claim 5 wherein method is performed by operation of an AFP resource installer.

8. The method of claim 7 wherein the method is performed by cooperative operation of an install data object wizard and by a CMR installer both invoked by operation of the AFP resource installer.

9. The method of claim 5 wherein the step of automatically generating further comprises:
    removing the ICC profile from the presentation object in response to generating the CC CMR to reduce a storage size of the presentation object.

10. The method of claim 5 wherein the step of automatically generating further comprises:

copying the ICC profile from the presentation object prior to generation of the CC CMR.

11. A non-transitory computer program product comprising a computer readable medium embodying a computer readable program, wherein the computer readable program when executed on an Advanced Function Presentation (AFP) printing environment computer causes the computer to perform the steps of:

receiving from a user a presentation object having an International Color Consortium (ICC) profile embedded within the presentation object;

determining whether the ICC profile corresponds to a stored AFP color conversion color management resource (CC CMR);

associating the corresponding stored AFP CC CMR with the presentation object in response to a determination that the ICC profile corresponds to a stored AFP CC CMR; and responsive to a determination that the ICC profile does not correspond to any stored AFP CC CMR, performing the additional steps of:

automatically generating an AFP CC CMR wherein information in the AFP CC CMR is derived from the ICC profile;

associating the generated AFP CC CMR with the presentation object; and storing the presentation object and the AFP CC CMR in an object library of the AFP printing environment for re-use in conjunction with presenting objects of a print job.

12. The program product of claim 11 wherein a format of the presentation object is selected from the group of formats consisting of: tagged image file format (TIFF), joint photographic experts group (JPEG or JPG), graphics interchange format (GIF), image object content architecture (IOCA), portable document format (PDF), encapsulated Postscript (EPS), and printer control language (PCL).

13. The program product of claim 11 wherein method steps are performed by operation of an AFP resource installer.

14. The program product of claim 13 wherein the method steps are performed by operation of an install data object wizard and by a CMR installer both invoked by operation of the AFP resource installer.

15. The program product of claim 11 wherein the step of automatically generating further comprises:

removing the ICC profile from the presentation object following generation of the CC CMR to reduce a storage size of the presentation object.

16. The program product of claim 11 wherein the step of automatically generating further comprises:

copying the ICC profile from the presentation object prior to generation of the CC CMR.

* * * * *